United States Patent
Sasaki (10) Patent No.: US 11,703,588 B2
(45) Date of Patent: Jul. 18, 2023

(54) REFLECTION OBJECT POSITION CALCULATING DEVICE, REFLECTION OBJECT POSITION CALCULATING METHOD, AND REFLECTION OBJECT POSITION CALCULATING PROGRAM

(71) Applicant: TOPCON CORPORATION, Tokyo (JP)

(72) Inventor: You Sasaki, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 582 days.

(21) Appl. No.: 16/435,608

(22) Filed: Jun. 10, 2019

(65) Prior Publication Data
US 2019/0383944 A1  Dec. 19, 2019

(30) Foreign Application Priority Data

Jun. 19, 2018  (JP) .................................. 2018-115949

(51) Int. Cl.
*G01S 17/00*  (2020.01)
*G06T 7/70*  (2017.01)
(Continued)

(52) U.S. Cl.
CPC ............ *G01S 17/00* (2013.01); *G01B 11/002* (2013.01); *G01B 11/24* (2013.01); *G06T 7/70* (2017.01); *G06T 2207/10028* (2013.01)

(58) Field of Classification Search
CPC ............................. G01S 17/00; G01B 11/002
See application file for complete search history.

(56) References Cited

U.S. PATENT DOCUMENTS

| 5,940,170 A | * | 8/1999 | Berg | .................... G01S 7/4972 356/5.1 |
| 6,701,691 B1 | * | 3/2004 | Niiduma | ............... E04B 1/3211 52/81.3 |

(Continued)

FOREIGN PATENT DOCUMENTS

| JP | H07-306045 A | 11/1995 |
| JP | H09-218021 A | 8/1997 |

(Continued)

OTHER PUBLICATIONS

Extended European Search Report dated Nov. 6, 2019, in connection with European Patent Application No. 19177242.5, 8 pgs.

(Continued)

*Primary Examiner* — Arleen M Vazquez
*Assistant Examiner* — Brandon J Becker
(74) *Attorney, Agent, or Firm* — Chiesa, Shahinian & Giantomasi PC (57) ABSTRACT

Point cloud data that is missed due to an optical reflection object in measuring point cloud data using a laser scanner is used. A reflection object position calculating device includes a point cloud data receiving unit, a three-dimensional point cloud model generating unit, a missing data part searching unit, a missing data part determining unit, and a reflection object position calculator. The point cloud data receiving unit receives point cloud data. The three-dimensional point cloud model generating unit generates a three-dimensional point cloud model from the received point cloud data. The missing data part searching unit searches for a missing data part of the generated three-dimensional point cloud model. The missing data part determining unit determines whether the found missing data part has a predetermined specific shape. The reflection object position calculator calculates (Continued)

three-dimensional coordinates of the missing data part that is determined as having the specific shape.

2 Claims, 6 Drawing Sheets

(51) Int. Cl.
*G01B 11/00* (2006.01)
*G01B 11/24* (2006.01)

(56) References Cited

U.S. PATENT DOCUMENTS

| | | |
|---|---|---|
| 7,995,055 B1 | 8/2011 | Ma et al. |
| 8,351,025 B2 | 1/2013 | Ootani et al. |
| 8,767,190 B2 | 7/2014 | Hall |
| 2001/0038705 A1* | 11/2001 | Rubbert .............. A61C 7/00 382/128 |
| 2005/0043837 A1* | 2/2005 | Rubbert .............. A61C 7/00 700/98 |
| 2006/0142098 A1* | 6/2006 | Sajima ............ A63B 37/0012 473/378 |
| 2008/0074637 A1 | 3/2008 | Kumagai et al. |
| 2009/0220145 A1 | 9/2009 | Ootani et al. |
| 2009/0241358 A1 | 10/2009 | Ohtomo et al. |
| 2010/0256940 A1 | 10/2010 | Ogawa et al. |
| 2012/0218546 A1 | 8/2012 | Ogawa et al. |
| 2014/0300775 A1* | 10/2014 | Fan ................... H04N 1/32128 348/231.3 |
| 2015/0293224 A1 | 10/2015 | Eldada et al. |
| 2016/0012646 A1* | 1/2016 | Huang ................. G06T 5/005 345/419 |
| 2016/0341541 A1* | 11/2016 | Bridges ................ G01S 7/481 |
| 2017/0372527 A1* | 12/2017 | Murali .................. G06T 7/38 |
| 2018/0284230 A1* | 10/2018 | Komuro .............. G01S 7/4808 |
| 2019/0108396 A1* | 4/2019 | Dal Mutto ........... G06V 20/52 |

FOREIGN PATENT DOCUMENTS

| | | |
|---|---|---|
| JP | 2000-221032 A | 8/2000 |
| JP | 2008-268004 A | 11/2008 |
| JP | 2009-204449 A | 9/2009 |
| JP | 2010-151682 A | 7/2010 |
| JP | 5466807 B2 | 4/2014 |
| JP | 2015-206651 A | 11/2015 |

OTHER PUBLICATIONS

Nadabar et al., "Fusion of range and intensity images on a connection machine (CM-2)," Pattern Recognition, Elsevier, vol. 28, No. 1, Jan. 1, 1995, pp. 11-26, XP004014029, ISSN: 0031-3203.

Notice of Reasons for Refusal dated Jun. 2, 2022, in connection with Japanese Patent Application No. 2018-115949, filed Jun. 19, 2018, 8 pgs. (including translation).

Notice of Reasons for Refusal dated Jun. 2, 2022, in connection with Japanese Patent Application No. 2018-115949, filed Jun. 19, 2019, 8 pgs. (including translation).

* cited by examiner

(a) Measurement object having reflection prism (b) Point cloud data obtained from measurement object having reflection prism

REFLECTION OBJECT POSITION CALCULATING DEVICE, REFLECTION OBJECT POSITION CALCULATING METHOD, AND REFLECTION OBJECT POSITION CALCULATING PROGRAM

CROSS-REFERENCE TO RELATED APPLICATIONS

This application is based upon and claims benefit of priority from Japanese Patent Application No. 2018-115949, filed Jun. 19, 2018, the entire contents of which are incorporated herein by reference.

TECHNICAL FIELD

The present invention relates to a surveying technique using point cloud data.

BACKGROUND

A device for obtaining point cloud data of an object to be surveyed or a target may be embodied by a laser scanner. One such laser scanner is disclosed in, for example, Japanese Patent No. 5466807. A surveying device emits laser light for measuring a distance to a specific point or a position of a specific point. The laser light is reflected by a reflection component, such as a reflection prism. Such a reflection prism is disclosed in, for example, Japanese Unexamined Patent Applications Laid-Open Nos. 2000-221032 and 07-306045.

SUMMARY

A laser scanner functions as a device for obtaining point cloud data of an object to be surveyed or a target. The laser scanner emits pulsed laser light for laser scanning, to the object to obtain an outline of the object in the form of point cloud data having three-dimensional coordinate information. Thus, three-dimensional measurement is performed. However, when the pulsed laser light is emitted to an optical reflection object, such as a reflection prism, very intense reflection light is generated, and this light saturates a light receiving element in some cases. Saturation of the light receiving element can cause pieces of point cloud data to be missing in measurement immediately after saturation as well as in measurement at the time of saturation. This results in missing point cloud data at a part of the obtained outline, and this part has a characteristic "key" shape (paddle shape). An object of the present invention is to provide a surveying technique for identifying a position of an optical reflection object by using a characteristic specific shape generated due to missing pieces of data at a part of the optical reflection object that is subjected to laser scanning. The characteristic specific shape is, for example, a key shape.

A first aspect of the present invention provides a reflection object position calculating device for calculating a position of a reflection object. The reflection object position calculating device includes a processor configured to receive point cloud data, generate a three-dimensional point cloud model from the received point cloud data, search for a missing data part of the generated three-dimensional point cloud model, determine whether the found missing data part has a predetermined specific shape, and calculate three-dimensional coordinates of the missing data part that is determined as having the specific shape, as the position of the reflection object.

According to a second aspect of the present invention, in the first aspect of the present invention, the reflection object may be positioned at an apex of a three-dimensional object, and the reflection object position calculator may calculate three-dimensional coordinates of the apex as the position of the reflection object, on a basis of the point cloud data of a plane of the three-dimensional object adjacent to the missing data part of the three-dimensional object.

According to a third aspect of the present invention, in the first or the second aspect of the present invention, a point of intersection of three or greater planes of the three-dimensional object may be calculated as a position of an optical center of the reflection object.

According to a fourth aspect of the present invention, in any one of the first to the third aspects of the present invention, the missing data part searching unit may determine that an optical reflection object does not exist in a case in which a missing data part of the three-dimensional point cloud model is not found.

According to a fifth aspect of the present invention, in any one of the first to the fourth aspects of the present invention, the missing data part determining unit may determine that an optical reflection object does not exist in a case of not determining the missing data part as having the specific shape.

According to a sixth aspect of the present invention, in any one of the first to the fifth aspects of the present invention, the reflection object position calculating device may further include a laser scanner controlling unit configured to generate a control signal for operating each functional unit of a laser scanner to control the laser scanner.

According to a seventh aspect of the present invention, in the sixth aspect of the present invention, in a case in which the missing data part searching unit does not find the missing data part of the three-dimensional point cloud model or in a case in which the missing data part determining unit does not determine the missing data part as having the specific shape, the laser scanner controlling unit may make the laser scanner change an area from which point cloud data is to be obtained, perform laser scanning again, and transmit the measured point cloud data to the reflection object position calculating device.

According to an eighth aspect of the present invention, in any one of the first to the seventh aspects of the present invention, the specific shape may be the shape of a key.

A ninth aspect of the present invention provides a reflection object position calculating method for calculating a position of a reflection object. The reflection object position calculating method includes receiving point cloud data, generating a three-dimensional point cloud model from the received point cloud data, searching for a missing data part of the generated three-dimensional point cloud model, determining whether the found missing data part has a predetermined specific shape, and calculating three-dimensional coordinates of the missing data part that is determined as having the specific shape, as the position of the reflection object.

A tenth aspect of the present invention provides a non-transitory computer recording medium storing computer executable instructions for calculating a position of a reflection object. The computer executable instructions, when executed by a computer processor, cause the computer processor to receive point cloud data, generate a three-dimensional point cloud model from the received point cloud data, and search for a missing data part of the generated three-dimensional point cloud model. The computer executable instructions, when executed by a computer processor, also cause the computer processor to determine whether the found missing data part has a predetermined specific shape, and calculate three-dimensional coordinates of the missing data part that is determined as having the specific shape, as the position of the reflection object.

The present invention enables identifying a position of an optical reflection object by measuring point cloud data by means of a laser scanner. For example, there may be a missing data part during measurement of point cloud data of a measurement object with a reflection prism by a laser scanner. In this case, the position of the reflection prism is identified from the missing data part that is determined as being caused by the reflection prism from its shape.

DETAILED DESCRIPTION

1. First Embodiment (Overview)

This embodiment shows a technique of calculating a position of an optical reflection object by determining existence of the optical reflection object from a characteristic shape of a missing data part of the optical reflection object. The missing data part is generated in the case of scanning the optical reflection object with laser light by a laser scanner for measuring point cloud data. This embodiment is illustrated herein by using a reflection prism as the optical reflection object.

Figure 1:
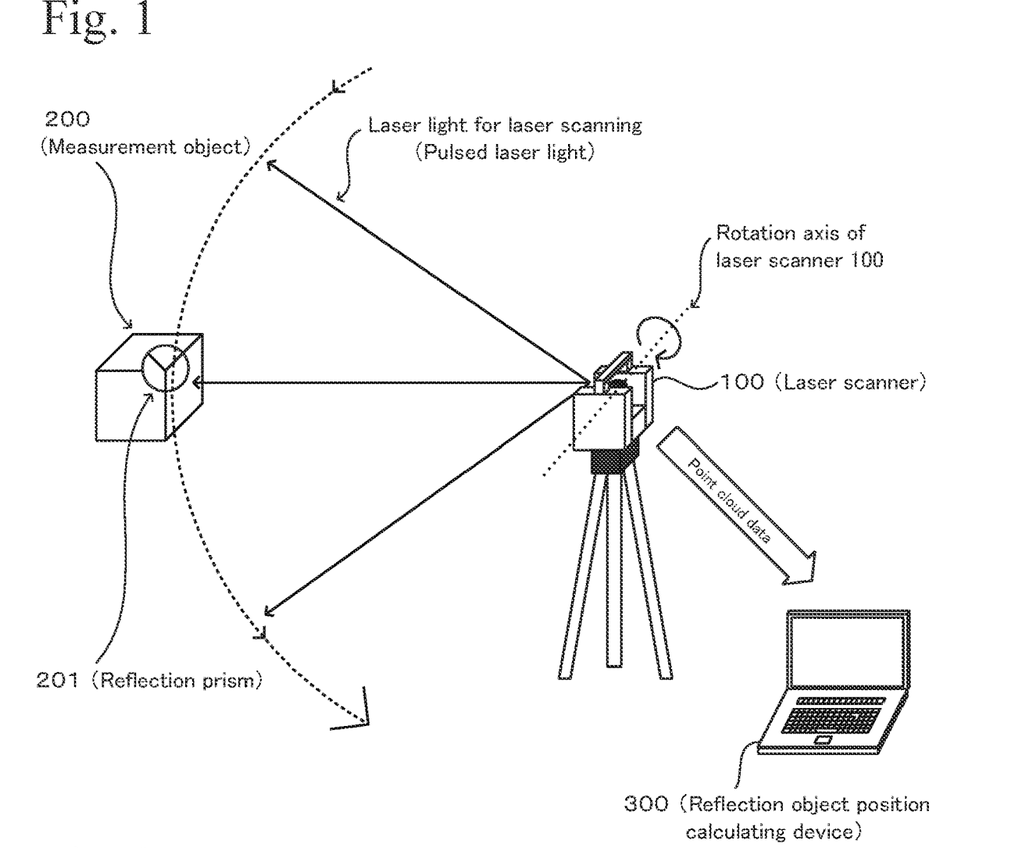
FIG. 1 is a conceptual diagram of an embodiment.

FIG. 1 is a conceptual diagram of this embodiment. FIG. 1 shows a situation in which, after a laser scanner 100 scans a measurement object 200 with laser light to obtain point cloud data, a reflection object position calculating device 300 processes the obtained point cloud data. The measurement object 200 is an object having a reflection prism 201 and is to be measured by the laser scanner 100.

Structure of Laser Scanner

The laser scanner 100 emits pulsed laser light to a measurement object and thereby scans the measurement object. The laser scanner 100 detects light reflected back from the measurement object to obtain an outline of the measurement object in terms of point cloud data added with three-dimensional coordinates.

Figure 2:
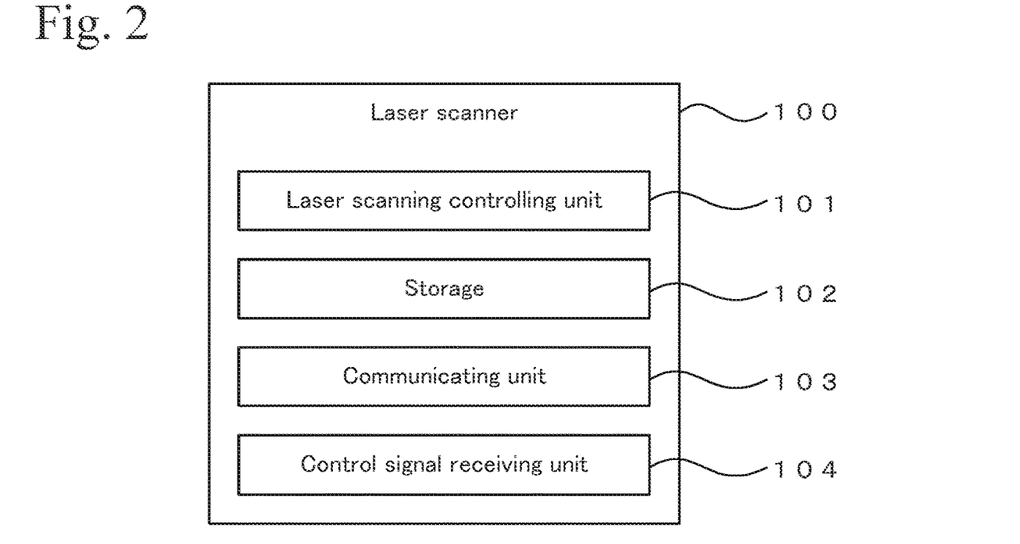
FIG. 2 is a block diagram of a laser scanner.

FIG. 2 is a block diagram of the laser scanner 100 shown in FIG. 1. The laser scanner 100 includes a laser scanning controlling unit 101, a storage 102, a communicating unit 103, and a control signal receiving unit 104.

The laser scanning controlling unit 101 controls operation of the laser scanner 100 for obtaining point cloud data of the measurement object. The storage 102 stores point cloud data obtained by laser scanning, a control program necessary to operate the laser scanner 100, various kinds of data, and other information. The communicating unit 103 transmits and receives a signal to and from an external device and enables transmission and reception of various kinds of data. The control signal receiving unit 104 receives a signal from an external device via the communicating unit 103 as a control signal and makes each functional unit of the laser scanner 100 operate accordingly. In this embodiment, a laser scanning operation instruction and a point cloud data transmission instruction are received from the reflection object position calculating device 300.

Techniques relating to the laser scanner are disclosed in Japanese Unexamined Patent Applications Laid-Open Nos. 2010-151682 and 2008-268004 and U.S. Pat. No. 8,767,190, for example. In addition, one that electronically scans, as disclosed in U.S. Patent Application Publication No. 2015/0293224, may also be used as the laser scanner.

Structure of Measurement Object

The measurement object 200 is to be subjected to laser scanning by the laser scanner 100 and is a surveying target, for example. In this embodiment, the measurement object 200 is a stationary object and includes a reflection prism 201 as an optical reflection object. The present invention as in this embodiment may use a stationary measurement object or a moving measurement object.

In this embodiment, the measurement object 200 is a cube or a hexahedron and includes the reflection prism 201 that is fixed at an apex of the cube. The position of the apex and the position of an optical center or a reflection center of the reflection prism 201 are made to coincide with each other. Alternatively, the measurement object 200 may use a polyhedron such as a triangular pyramid, a quadrangular pyramid, or a pentagonal pyramid, and the reflection prism 201 may be disposed at the position of the apex of the polyhedron. Also in this case, the position of the apex of the polyhedron is made to coincide with the position of the optical center of the reflection prism 201.

Structure of Reflection Object Position Calculating Device

The reflection object position calculating device 300 calculates a position of the reflection prism, which is an optical reflection object, from point cloud data obtained in laser scanning performed by the laser scanner 100. The reflection object position calculating device 300 is constructed of each type of a central processing unit (CPU), a memory, and an interface. The reflection object position calculating device 300 may be constructed as a part of a general-purpose computer or a tablet or may be constructed as a dedicated device.

Figure 3:
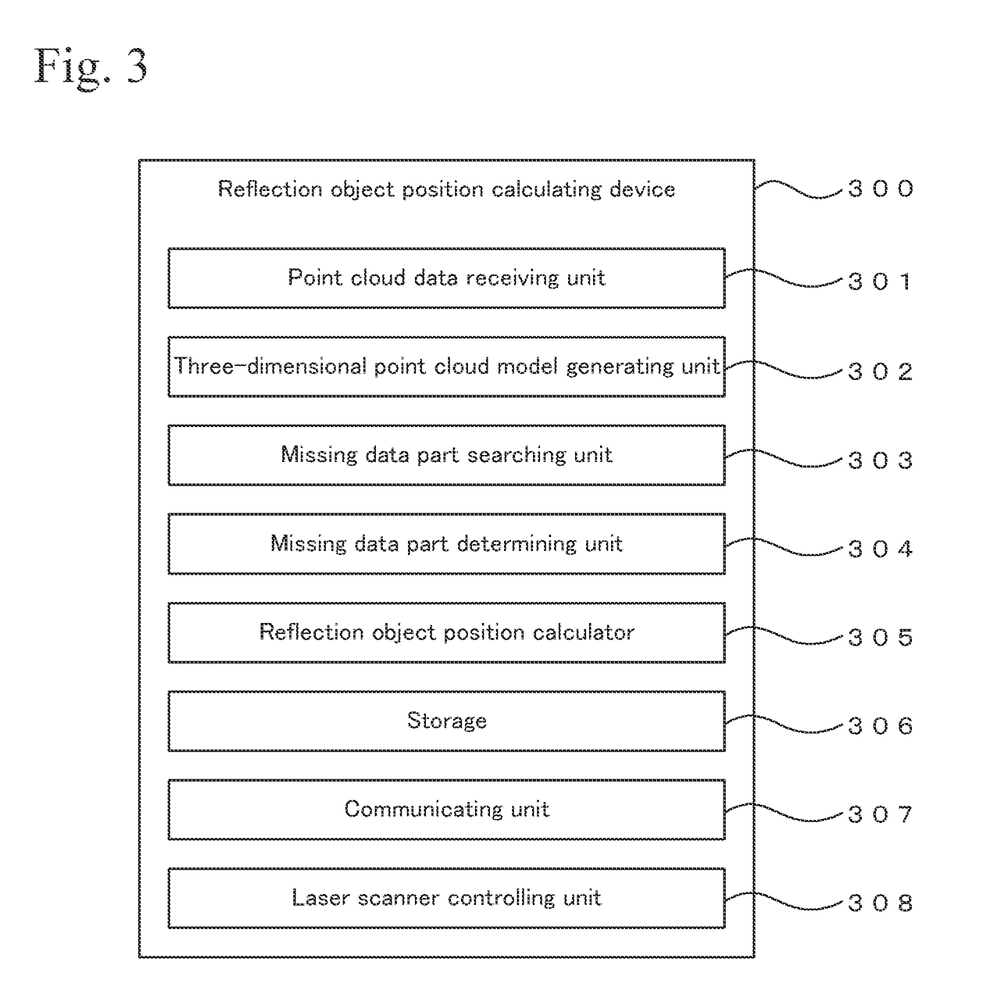
FIG. 3 is a block diagram of a reflection object position calculating device.

FIG. 3 is a block diagram of the reflection object position calculating device 300 shown in FIG. 1. The reflection object position calculating device 300 includes a point cloud data receiving unit 301, a three-dimensional point cloud model generating unit 302, a missing data part searching unit 303, a missing data part determining unit 304, a reflection object position calculator 305, a storage 306, a communicating unit 307, and a laser scanner controlling unit 308.

For example, each of the functional units of the reflection object position calculating device 300 is constructed of an electronic circuit such as a CPU, an application specific integrated circuit (ASIC), or a programmable logic device (PLD) represented by a field programmable gate array (FPGA). Additionally, some functions may be implemented by dedicated hardware, and the rest may be implemented by a general-purpose microcomputer.

Whether each of the functional units of the reflection object position calculating device 300 is to be constructed of dedicated hardware or is to be constructed of software so that programs are executed by a CPU is determined in consideration of necessary operating speed, cost, amount of electricity consumed, and other factors. Constructing the functional unit by dedicated hardware and constructing the functional unit by software are equivalent to each other from the point of view of implementing a specific function.

The reflection object position calculating device 300 may be equipped on the laser scanner 100 or may be integrated as a functional unit to the laser scanner 100. Alternatively, the reflection object position calculating device 300 may be separated from the laser scanner 100. None of these cases prevents implementing the present invention.

The point cloud data receiving unit 301 receives point cloud data of the measurement object 200 from the laser scanner 100. The three-dimensional point cloud model generating unit 302 generates a three-dimensional point cloud model of the measurement object 200 from the point cloud data received by the point cloud data receiving unit 301. The three-dimensional point cloud model generated in this case is a polyhedron obtained by connecting points of the point cloud data.

The missing data part searching unit 303 searches for a missing data part of the three-dimensional point cloud model generated by the three-dimensional point cloud model generating unit 302. The missing data part determining unit 304 determines whether the missing data part, which is found by the missing data part searching unit 303, has a "key" shape due to light reflected back from the reflection prism 201.

Figure 4:
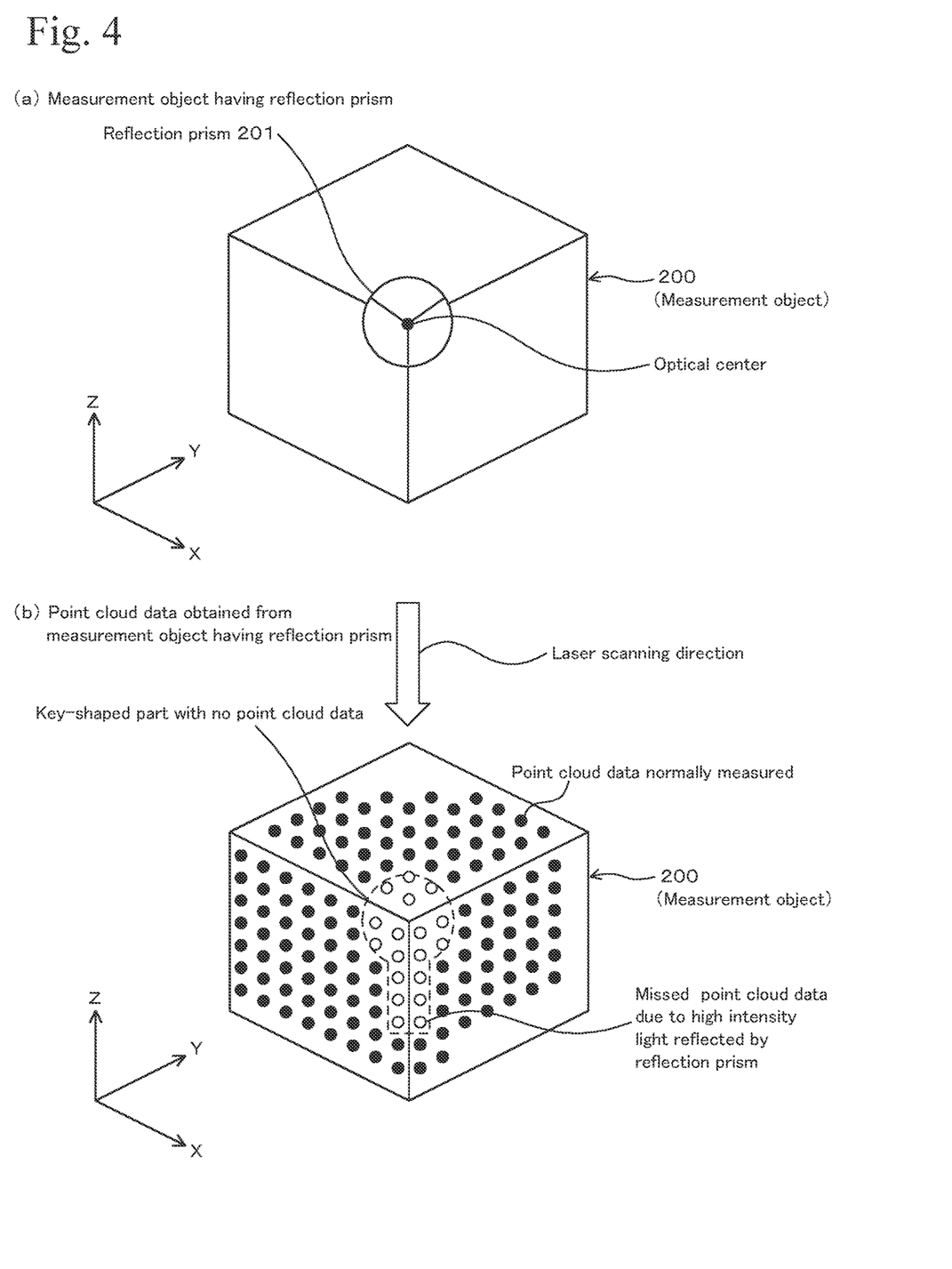
FIG. 4 shows a part with a key shape due to missing pieces of point cloud data.

An example of a part with missing point cloud data having a "key" shape is shown in FIG. 4. FIG. 4 shows a shape of a missing data part in the case of scanning the measurement object 200, which is a measurement object in this embodiment, using laser light. As shown in FIG. 4, point cloud data of a position that is scanned by the laser light after the laser light scans a center of the reflection prism 201 is missed as well as the position at which the reflection prism 201 exists. The reason for this is that the laser scanning is performed to an optical center existing at the center of the reflection prism 201. The optical center is positioned at an apparent center of the prism due to optical refraction and is a part that reflects light with highest intensity. Thus, laser scanning the vicinity of the optical center causes saturation of the light receiving element, resulting in taking a time to recover the light receiving element. As a result, point cloud data at the position at which the reflection prism 201 exists as well as at the position at which the laser light subsequently scans are not measured. That is, point cloud data is missed at the position at which the reflection prism 201 exists and at a position under the center of the reflection prism 201, whereby a "key"-shaped part with missing point cloud data is generated.

This embodiment is exemplified by a case in which missing of point cloud data occurs in the shape of a "key" due to light reflected back from the reflection prism 201. However, the shape may not be a "key" shape in some cases, depending on factors such as the kind and operation conditions of the light receiving element, the type of the reflection prism, and the manner and speed of laser scanning. For example, there may be cases in which missing of point cloud data occurs in the shape of a rectangular, an inverted triangle, a spindle, or another shape. From this point of view, the shape of a part with missing point cloud data, which occurs in using a combination of a reflection object and laser scanning, is preliminarily examined and determined.

The reflection object position calculator 305 calculates three-dimensional coordinates of the missing data part, which is determined as having a "key" shape by the missing data part determining unit 304. The three-dimensional coordinates of the missing data part is calculated as follows: three or more simultaneous equations are prepared using at least three points per one plane of the point cloud data around the missing data part, the prepared simultaneous equations are solved to obtain a plane equation of each plane, and the plane equations of the planes are solved as simultaneous equation to obtain common results (x, y, z) as three-dimensional coordinates. The calculated three-dimensional coordinates at the missing data part are coordinates of an optical reflection object such as a reflection prism.

The measurement object 200 may be a cube or a hexahedron, and an optical center of the reflection prism 201 and a position of an apex of the measurement object 200 may be made to coincide with each other, as in the case of this embodiment. In such a case, point cloud data is missed at a part centering at the apex of the measurement object 200. Thus, in this case, plane equations of three planes around a key-shaped part with missing point cloud data are prepared, and an intersection point of the three planes is obtained to calculate three-dimensional coordinates of the optical center of the reflection prism 201.

Instead of the method using the plane equation, the reflection object position calculator 305 may use any other method for calculating the three-dimensional coordinates of the missing data part, which is determined as having a "key" shape by the missing data part determining unit 304. In one example, multiple points of point cloud data normally measured in proximity to the part with missing point cloud data may be assumed to be points positioned at outermost parts of the part with missing point cloud data, and the optical center of the reflection prism or of another object may be calculated from a positional relationship between each of the multiple assumed points. In addition, this case may also use the plane equation.

The reflection object position calculator 305 may approximately calculate the position of the optical center of the reflection prism or of another object instead of exactly calculating it. In this case, the reflection object position calculating device 300 can provide information of an approximate position of the optical reflection object to another device, for example, a total station. The device that receives the information of the approximate position of the optical reflection object may perform processing based on this information, for example, precise measurement primarily for the approximate position of the reflection prism.

The reflection object position calculating device 300 includes the storage 306 and the communicating unit 307. The storage 306 stores point cloud data received from the laser scanner 100, a control program necessary to operate the reflection object position calculating device 300, various kinds of data, and other information. The communicating unit 307 transmits and receives a signal to and from an external device and enables transmission and reception of various kinds of data.

The laser scanner controlling unit 308 generates a control signal for operating each functional unit of the laser scanner 100 to control the laser scanner 100. For example, the laser scanner controlling unit 308 generates a control signal that causes the laser scanner 100 to perform operations such as laser scanning and transmitting point cloud data.

Example of Processing

Figure 5:
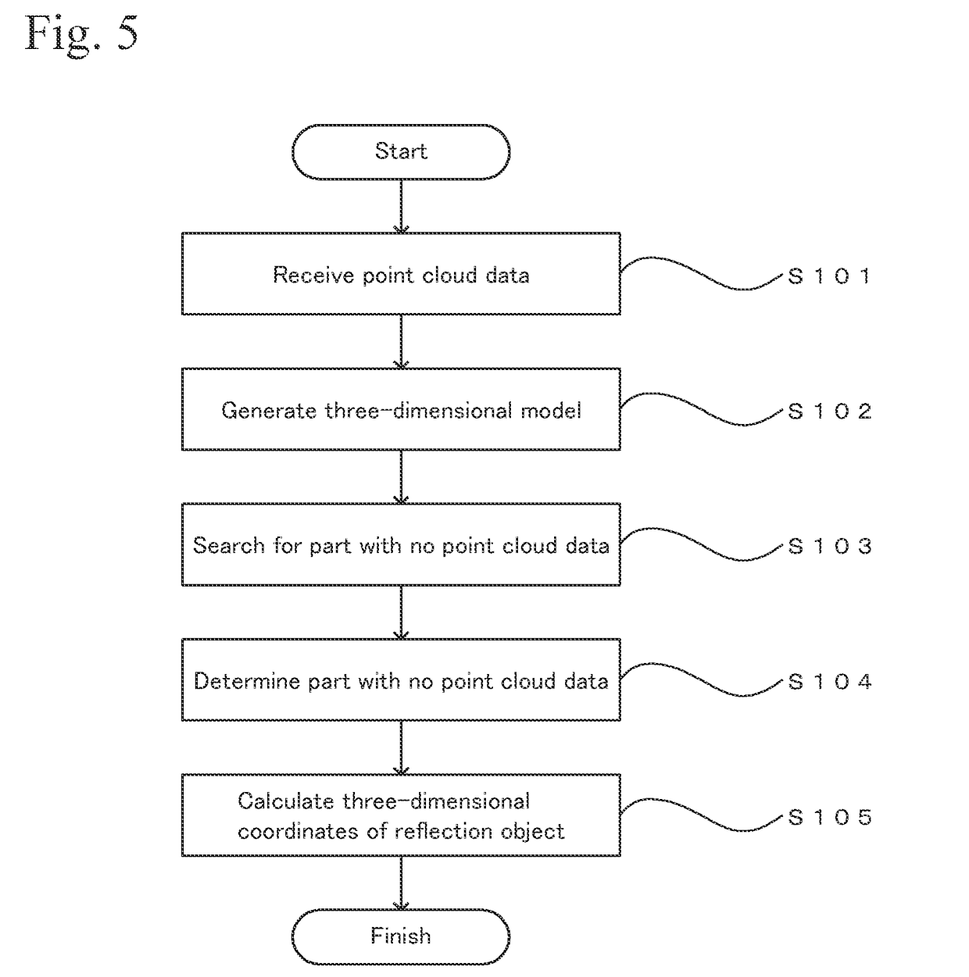
FIG. 5 is a flowchart showing an example of processing.

FIG. 5 shows an example of processing that is performed by the reflection object position calculating device 300 in this embodiment. Before starting the processing shown in FIG. 5, the laser scanner 100 performs laser scanning on the measurement object 200 having the reflection prism 201, and point cloud data of the measurement object 200 is obtained. In addition, the reflection prism 201 is fixed so that the optical center of the reflection prism 201 will coincide with the position of the apex of the measurement object 200.

First, the reflection object position calculating device 300 receives point cloud data of the measurement object 200 from the laser scanner 100 via the point cloud data receiving unit 301 (step S101). The laser scanner 100 is made to perform laser scanning and transmit point cloud data by the function of the laser scanner controlling unit 308.

Next, the three-dimensional point cloud model generating unit 302 generates a three-dimensional point cloud model from the point cloud data of the measurement object 200, which is received in step S101 (step S102). The missing data part searching unit 303 searches for a part with missing point cloud data from the three-dimensional point cloud model of the measurement object 200, which is generated in step S102 (step S103).

Thereafter, the missing data part determining unit 304 determines whether the part with missing point cloud data, which is found in step S103, has a "key" shape (step S104). Finally, the reflection object position calculator 305 calculates three-dimensional coordinates of the part with missing point cloud data, which is determined as having a "key" shape in step S104, as three-dimensional coordinates of the reflection prism 201 (step S105). Then, the processing is completed.

In step S105, coordinates of the position of the apex of the measurement object 200, at which the reflection prism 201 is disposed, are calculated from the point cloud data around the part with missing point cloud data, whereby position data of the optical center of the reflection prism 201 is obtained.

Modification Example 1

Figure 6:
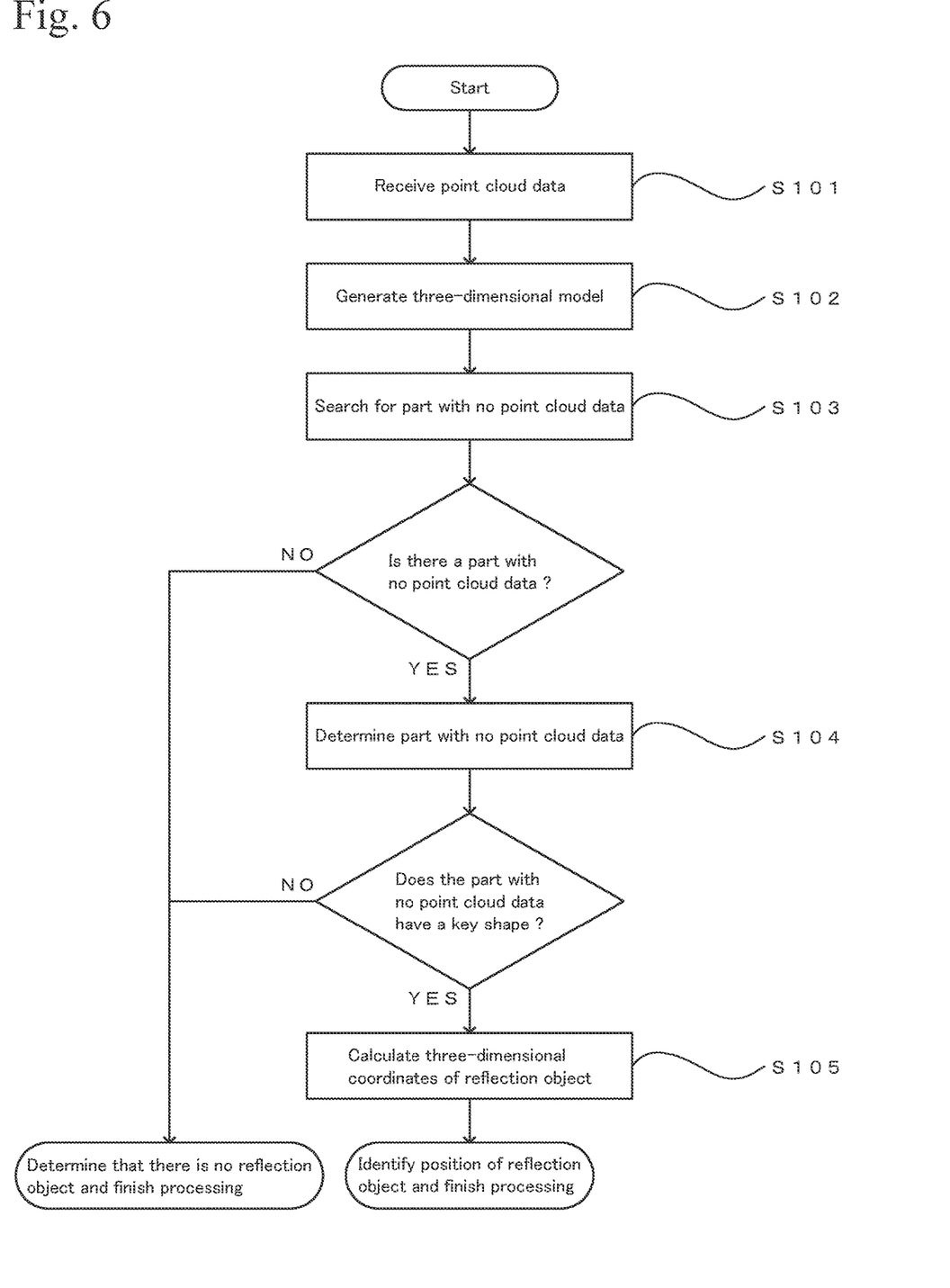
FIG. 6 is a flowchart showing an example of the processing.

The processing in steps S101 to 105 is performed on the condition that the measurement object 200 includes the reflection prism 201. However, there may be cases in which the measurement object 200 does not include the reflection prism 201, and in which the measurement object 200 does not exist in a point cloud data obtaining area. An example of the processing for these cases is shown in FIG. 6. As shown in FIG. 6, if no part is found to have missing point cloud data in step S103, the missing data part searching unit 303 determines that no reflection prism exists in the point cloud data obtaining area, and the processing is finished. Even if there is found a part with missing point cloud data due to a factor other than existence of the reflection prism 201 in step S103, unless this part is determined as having a "key" shape in step S104, the missing data part determining unit 304 determines that no reflection prism exists in the point cloud data obtaining area, and the processing is finished. This is because this part with missing point cloud data occurs due to a factor other than existence of the reflection prism 201.

The processing of this modification example may also be performed in a case in which no part is found to have missing point cloud data or a part with missing point cloud data does not have a "key" shape, due to other causes, even though the measurement object 200 includes the reflection prism 201.

Modification Example 2

Figure 7:
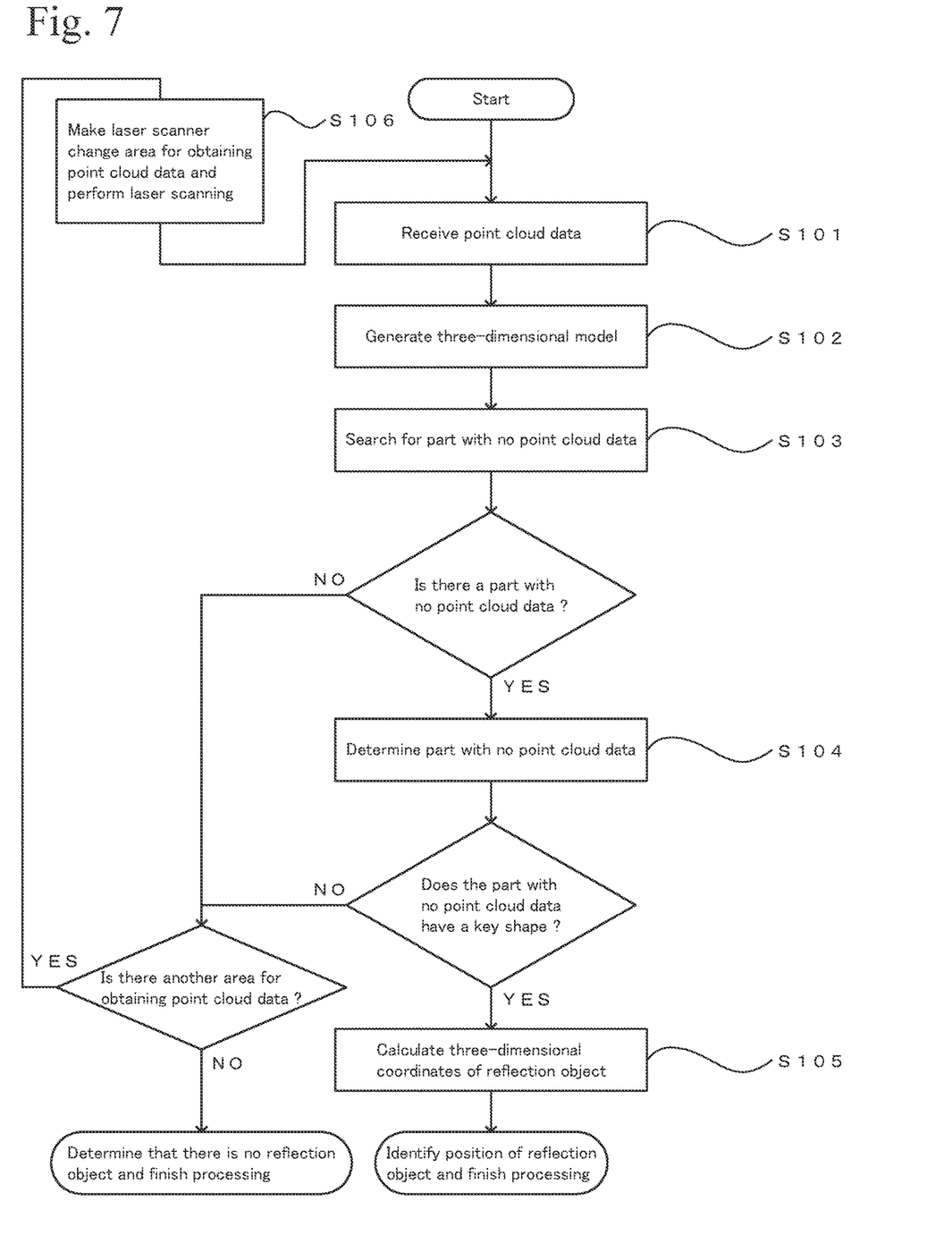
FIG. 7 is a flowchart showing an example of the processing.

An example of the processing in this modification example is shown in FIG. 7. In this modification example, as shown in FIG. 7, if the reflection prism 201 is not found in the measured point cloud data obtaining area in step S103 or S104, the reflection object position calculating device 300 makes the laser scanner controlling unit 308 inquire whether there is another point cloud data obtaining area, other than the point cloud data obtaining area that is measured by the laser scanner 100. If there is such another area, the reflection object position calculating device 300 makes the laser scanner 100 change the point cloud data obtaining area and perform laser scanning (step S106). Thus, the processing is performed again from step S101. Otherwise, if there is no other point cloud data obtaining area, it is determined that the reflection prism does not exist in the point cloud data obtaining area, and the processing is finished.

As described above, inquiring the point cloud data obtaining area to the laser scanner 100, and making the laser scanner 100 change the point cloud data obtaining area and perform laser scanning are implemented by the function of the laser scanner controlling unit 308. More specifically, the laser scanner controlling unit 308 generates a control signal to inquire a point cloud data obtaining area to the laser scanner 100 and generates a control signal to cause the laser scanner 100 change the point cloud data obtaining area and perform laser scanning. The laser scanner controlling unit 308 transmits the generated control signal from the communicating unit 307 to the laser scanner 100 to make the laser scanner 100 answer the inquiry or operate as instructed. To make the laser scanner 100 change the point cloud data obtaining area, for example, an irradiation distance of pulsed laser light may be changed.

The processing of this modification example enables searching for the optical reflection object even when the position of the optical reflection object is completely unknown. In a case in which the reflection prism is not found after the point cloud data obtaining area is changed, the processing similar to those in the modification example 1 may be performed.

2. Second Embodiment

The first embodiment enables estimation of existence of the reflection prism 201 on the basis of point cloud data that is missed in laser scanning. This embodiment employs this function and performs laser scanning on the reflection prism 201 again to obtain point cloud data of the reflection prism 201. The following describes an example of the processing.

In this embodiment, in the case in which there is found a specific shaped part with missing point cloud data in step S104 in FIG. 5, the direction of this part as viewed from the laser scanner 100 is obtained. Thus, an approximate direction of the reflection prism 201 is estimated.

After the direction of the reflection prism 201 is estimated on the basis of the missing point cloud data, laser scanning is performed again only in this direction. At this time, the laser scanning is performed again by narrowing the point cloud data obtaining area primarily in the direction in which missing of the point cloud data occurs, in the condition in which emission intensity is decreased or a neutral-density filter is inserted in a light receiving path. This other laser scanning provides point cloud data relating to the reflection prism 201.

This method can also be employed when the reflection prism 201 is used alone, without using the measurement object 200.

3. Third Embodiment

This embodiment relates to another technique for detecting missing of point cloud data. This embodiment uses a photodiode as a light receiving element for laser scanning light that is reflected back from a target object. In this case, upon receiving light, a photocurrent flows in the photodiode functioning as the light receiving element, whereby reception of light is detected.

At this time, output of the photodiode is monitored to determine missing of point cloud data due to light reflected back from an optical reflection object, such as a reflection prism. Specifically, laser scanning light that is reflected back from an optical reflection object overloads the photodiode, whereby a photocurrent corresponding to incident light is not obtained. This state is detected to determine missing point cloud data due to a high intensity light reflected back from the optical reflection object. This method may be used alone, or it may be used in combination with the technique of determining the shape of the part with missing point cloud data.

4. Other Matters

The present invention may be employed in a surveying device having a laser scanner and a total station in a combined manner to automatically search for and track a mobile body with an optical reflection object. The mobile body is, for example, a UAV.

Advantages

The present invention enables determining three-dimensional coordinates of an optical reflection object by laser scanning using a laser scanner. This provides a position of the optical reflection object at the same time as the laser scanning for measuring point cloud data.

The present invention can be used in a surveying technique using point cloud data.

What is claimed is:

1. A reflection object position calculating method for calculating a position of a reflection prism disposed on a surveying target having a structure selected from the group consisting of a hexahedral structure, a triangular structure, a pyramid structure, a quadrangular pyramid structure, and a pentagonal pyramid structure, the reflection prism disposed so that a position of an optical center of the reflection prism coincides with a position of an apex of the surveying target, the method comprising:

obtaining point cloud data of the surveying target, the point cloud data being obtained by performing laser scanning on the surveying target;

generating a three-dimensional point cloud model of the surveying target based on the point cloud data;

searching for a missing data part of the three-dimensional point cloud model;

determining whether the missing data part has a key shape; and calculating a point of intersection of three or greater planes of the surveying target adjacent to the missing data part having the key shape, as a position of the optical center of the reflection prism, based on the point cloud data, the missing data part being generated due to saturation of a light receiving element that receives light reflected back from the reflection prism in performing laser scanning on the reflection prism, the key shape being a shape that is relatively large around the optical center of the reflection prism and extends thinly from the position of the optical center of the reflection prism along a scanning direction of scanning light of the laser scanning, in such a manner as to have a width narrower than at the optical center of the reflection prism.

2. A non-transitory computer recording medium storing computer executable instructions for calculating a position of a reflection prism disposed on a surveying target having a structure selected from the group consisting of a hexahedral structure, a triangular structure, a pyramid structure, a quadrangular pyramid structure, and a pentagonal pyramid structure, the reflection prism disposed so that a position of an optical center of the reflection prism coincides with a position of an apex of the surveying target, the computer executable instructions, when executed by a computer processor, causing the computer processor to:

obtain point cloud data of the surveying target, the point cloud data being obtained by performing laser scanning on the surveying target;

generate a three-dimensional point cloud model of the surveying target based on the point cloud data;

search for a missing data part of the three-dimensional point cloud model;

determine whether the missing data part has a key shape; and calculate a point of intersection of three or greater planes of the surveying target adjacent to the missing data part having the key shape, as a position of the optical center of the reflection prism, based on the point cloud data, the missing data part being generated due to saturation of a light receiving element that receives light reflected back from the reflection prism in performing laser scanning on the reflection prism, the key shape being a shape that is relatively large around the optical center of the reflection prism and extends thinly from the position of the optical center of the reflection prism along a scanning direction of scanning light of the laser scanning, in such a manner as to have a width narrower than at the optical center of the reflection prism.

* * * * *